United States Patent
Mellor et al.

(10) Patent No.: US 11,072,862 B2
(45) Date of Patent: Jul. 27, 2021

(54) METHODS OF MAKING GRAPHENE MATERIALS

(71) Applicant: Metalysis Limited, Rotherham (GB)

(72) Inventors: Ian Mellor, Rotherham (GB); Greg Doughty, Rotherham (GB)

(73) Assignee: METALYSIS LIMITED, Rotherham (GB)

(*) Notice: Subject to any disclaimer, the term of this patent is extended or adjusted under 35 U.S.C. 154(b) by 309 days.

(21) Appl. No.: 16/103,088

(22) Filed: Aug. 14, 2018

(65) Prior Publication Data
US 2019/0119115 A1    Apr. 25, 2019

Related U.S. Application Data

(63) Continuation-in-part of application No. PCT/GB2017/050416, filed on Feb. 17, 2017.

(30) Foreign Application Priority Data

Feb. 17, 2016   (GB) ........................................ 1602789
Nov. 11, 2016   (GB) ........................................ 1619053

(51) Int. Cl.
| C25B 1/135 | (2021.01) |
| C25B 1/00 | (2021.01) |
| C01B 32/184 | (2017.01) |
| C25C 3/28 | (2006.01) |
| C25B 11/043 | (2021.01) |
| C25C 3/26 | (2006.01) |
(Continued)

(52) U.S. Cl.
CPC ............ *C25B 1/135* (2021.01); *C01B 32/184* (2017.08); *C01B 32/196* (2017.08); *C25B 1/00* (2013.01); *C25B 11/043* (2021.01); *C25C 1/06* (2013.01); *C25C 3/26* (2013.01); *C25C 3/28* (2013.01); *C01P 2002/01* (2013.01); *C01P 2002/72* (2013.01); *C01P 2002/82* (2013.01); *C25B 11/02* (2013.01); *C25C 7/025* (2013.01)

(58) Field of Classification Search
CPC .............. C25B 1/135; C25C 3/28; C25C 3/26
See application file for complete search history.

(56) References Cited

U.S. PATENT DOCUMENTS

| 2010/0126660 A1 | 5/2010 | O'Hara |
| 2012/0160699 A1* | 6/2012 | Dudley .................... C22B 4/08 205/354 |

(Continued)

FOREIGN PATENT DOCUMENTS

| WO | 03/076690 A1 | 9/2013 |
| WO | 2015/019093 A1 | 2/2015 |

OTHER PUBLICATIONS

International Sear Report and Written Opinion dated May 31, 2017 issued in Int'l Application No. PCT/IB2017/050416.

*Primary Examiner* — Brian W Cohen
(74) *Attorney, Agent, or Firm* — Duane Morris LLP; Thomas J. Kowalski; Deborah L. Lu

(57) ABSTRACT

A method of making a graphene-containing material comprising the steps of: electrolytically reducing a transition metal oxide to a transition metal in an electrolytic cell using a molten salt electrolyte and a carbon anode; followed by extracting a dry graphene material from the electrolytic cell. Also provided is a graphene-containing material obtainable by the method of the invention.

19 Claims, 4 Drawing Sheets

(51) Int. Cl.
*C01B 32/196* (2017.01)
*C25C 1/06* (2006.01)
*C25C 7/02* (2006.01)
*C25B 11/02* (2021.01)

(56) References Cited

U.S. PATENT DOCUMENTS

2014/0202874 A1    7/2014   Elgammal et al.
2015/0291431 A1   10/2015   Tang et al.
2016/0115601 A1*   4/2016   Dryfe .................. C25B 1/00
                                                                                          205/615

* cited by examiner

METHODS OF MAKING GRAPHENE MATERIALS

RELATED APPLICATIONS AND INCORPORATION BY REFERENCE

This application is a Continuation-in-Part of international patent application Serial No. PCT/GB2017/050416 filed Feb. 17, 2017, which published PCT Publication No. WO 2017/141044 on Aug. 24, 2017, which claims priority and benefit of GB 1602789.8 filed Feb. 17, 2016 and GB 1619053.0 filed Nov. 11, 2016.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to methods of making materials containing graphene, and to materials containing graphene obtainable thereby.

BACKGROUND OF THE INVENTION

Citation or identification of any document in this application is not an admission that such document is available as prior art to the present invention.

Graphene in its ideal form is an atomically thick, two-dimensional sheet composed of $sp^2$ hybridized carbons in a honeycomb structure. Graphite itself is formed of many layers of graphene stacked on top of each other. Carbon nanotubes can be regarded as graphene sheets rolled into a tube. Graphene has unique and interesting electronic, mechanical and chemical properties.

There are many potential applications for graphene, for example: as an additive for polymers to improve mechanical, electrical, thermal, barrier and fire resistant properties; in electrodes for fuel cells, super-capacitors and lithium-ion or sodium-ion batteries; as a conductive, transparent coating for the replacement of indium tin oxide in electronic devices; and as a component in novel electronic devices that make use of the special electronic properties of graphene.

The graphene literature applies the term "graphene" to several materials besides the ideal graphene monolayer. These include "few layer graphene", which is typically 2 to 10 graphene layers thick. The properties of the material, particularly the electronic properties, are a function of the number of graphene layers, and at greater than 10 layers the material approaches the properties of bulk graphite. The term "graphene" is also applied to functionalised graphenes, such as graphene oxide (GO). Graphene oxide is a graphene layer that has been oxidised and has typically 30 atomic % oxygen content.

Graphene was first produced by mechanical exfoliation of graphite using an adhesive tape to isolate individual layers. However, a variety of methods for the production of graphene have been reported since then. Most of these methods rely on exfoliation of graphite.

For example, it has been shown that graphite can be exfoliated by the application of ultrasonic energy to separate the graphitic layers when in an appropriate solvent. The exfoliation can be assisted by the use of ionic liquids as the solvent, or by inclusion of intercalating agents such as lithium ions or tetrabutylammonium ions in the solvent, or by the inclusion of agents such as gum Arabic in the solvent that stabilize graphene.

The disadvantages of exfoliation methods include that they produce a mixture of materials dispersed in solution so that further separation and purification methods are needed. Furthermore, desirable yields of monolayer samples can only be achieved with prolonged application of ultrasonic energy, meaning that the lateral flake dimensions are very small, thus precluding many applications in electronic devices. The graphene may be contaminated with intercalating agents or graphene oxide. Finally, these methods are energy-intensive and slow.

The preparation of graphene using chemical vapor deposition techniques is known in the art. For example, reported techniques use methane as a carbon source and copper as a receiving surface. It is also known to produce high-quality graphene by epitaxial growth on silicon carbide surfaces. Graphene has also been produced chemically, by organic synthesis. However, these methods are complex, and expensive, and therefore not suitable for bulk production of graphene.

Electrochemical methods of making graphene are also known. Most of these methods rely on electrochemical intercalation of ionic species into graphite resulting in exfoliation of graphite.

For example, WO2013/132261A describes forming graphene by electrochemical intercalation of cations into a graphite cathode to exfoliate the graphite.

WO2015/121613A describes forming graphene by electrochemical intercalation of hydrogen ions into a graphite cathode to exfoliate the graphite. The electrolyte in this case is a molten salt, such as lithium chloride, containing hydrogen ions introduced by adding water vapor or hydrogen.

WO2007/046713A describes forming graphene by electrochemical reduction of carbon dioxide using a molten salt electrolyte and high current densities. This method involves substantial energy wastage and production of undesirable by-products due to electrolysis of the molten salt. WO2014/191765A describes production of graphene by electrochemical reduction of carbon dioxide in a cell having a cathode comprising a transition metal. The preferred electrolytes are ionic liquids at ambient temperature. Carbon dioxide gas is passed through the electrolyte. The production rate is low and the resulting graphene is contaminated with ionic liquid components.

Thus, there is a need to provide improved methods for producing graphene. Such methods should be suitable for production of graphene on a large scale, energy-efficient, reliable, environmentally friendly, provide higher quality material, provide increased yields of material, provide larger sheets or material, and/or provide easier isolation of material.

SUMMARY OF THE INVENTION

The present invention provides a method of making a graphene material comprising the steps of: electrolytically reducing a transition metal oxide to a transition metal in an electrolytic cell using a molten salt electrolyte and a carbon anode; followed by extracting a dry graphene material from the electrolytic cell.

In another aspect, the present invention provides a method of making a graphene material comprising the steps of: electrolytically reducing a transition metal oxide to a transition metal using a molten salt electrolyte and a carbon anode, wherein the step of electrolytically reducing results in deposition of a graphene material on the transition metal; separating the graphene from the transition metal and the electrolyte; and drying the separated graphene material.

The transition metal oxide may be mixed with other metallic oxides, including other transition metal oxides or non-transition metal oxides. In these embodiments, suitably all of the metal oxides are reduced to the corresponding metals in admixture in the electroreduction step. Suitably, the transition metal oxide or mixture is in the form of a powder, granulate, compacted powder body, and most suitably it is in the form of a sintered body.

Suitably, the transition metal oxide comprises, consists essentially of, or consists of a titanium oxide or a tantalum oxide. Most suitably, the transition metal oxide comprises, consists essentially of, or consists of a titanium oxide.

Suitably, the step of electrolytically reducing takes place in an atmosphere free of added water vapor, hydrogen or carbon dioxide. Suitably, no water, hydrogen or carbon dioxide are added during the process. Suitably, the step of electrolytically reducing is performed under an inert gas (apart from any reactive gases evolved during the electrolysis).

The step of separating may be performed for example, by methods comprising dispersing the electroreduced cathode material containing the transition metal and graphene in a suitable solvent such as water. The electroreduced cathode material may be crushed before or during the dispersion step. The graphene tends to remain in suspension or to float to the top of the liquid, which enables it to be separated from the metal. The graphene can be collected by suitable methods such as evaporation of solvent, filtration, interfacial separation or centrifugation. In embodiments, the method comprises isolating graphene material from an interfacial region of an aqueous/water-immiscible organic solvent system, preferably wherein the water-immiscible organic solvent comprises or consists essentially of toluene.

Suitably, the method further comprises one or more further steps of purifying the graphene. Any suitable method can be used, such as centrifuging, solvent separation, and interfacial separation.

Suitably, the step of electrolytically reducing is performed at a temperature above about 400° C., preferably above 600° C., more preferably about 900°-1000° C.

Suitably, the molten salt electrolyte comprises calcium chloride. More suitably, the electrolyte comprises at least about 95% calcium chloride, and from about 0.5% to about 5% of calcium oxide. Suitably, the electrolyte comprises less than 10% of lithium chloride, and most suitably it is substantially or completely free of lithium chloride.

The molten salt electrolyte is preferably substantially free from hydrogen ions. Suitably, the molten electrolyte comprises less than about 400 ppm of $H^+$, preferably less than about 250 ppm of $H^+$, more preferably less than about 100 ppm of $H^+$.

The as-collected graphene material may contain impurities such as metal particles, metal oxide particles and/or metal carbonate particles. Accordingly, the methods of the present invention may further comprise treating the graphene to remove residual transition metal, carbonate and/or metal oxide materials therefrom. Such methods may include washing with suitable solvents, centrifugation, particle size separation methods such as filtration, or any other method suitable for purifying carbon or graphene.

Graphene material also forms in a surface layer (scum) on the electrolyte during electrolysis. Accordingly, in embodiments of the methods of the present invention, the graphene material is extracted from a surface layer of the electrolyte following electrolysis. For example, a surface layer may be chipped from the surface of the electrolyte after the cell has been cooled following electrolysis. This surface layer material is suitably ground and then washed with water to remove electrolyte and leave the graphene material. The graphene material is then separated, e.g. by filtration, and dried to produce the dry graphene material. Drying is suitably performed in non-oxidizing conditions, such as under vacuum. Additional separation and purification steps are possible as described above.

In another aspect, the present invention provides a graphene material obtainable or obtained by a method according to the invention.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

Figure 1:
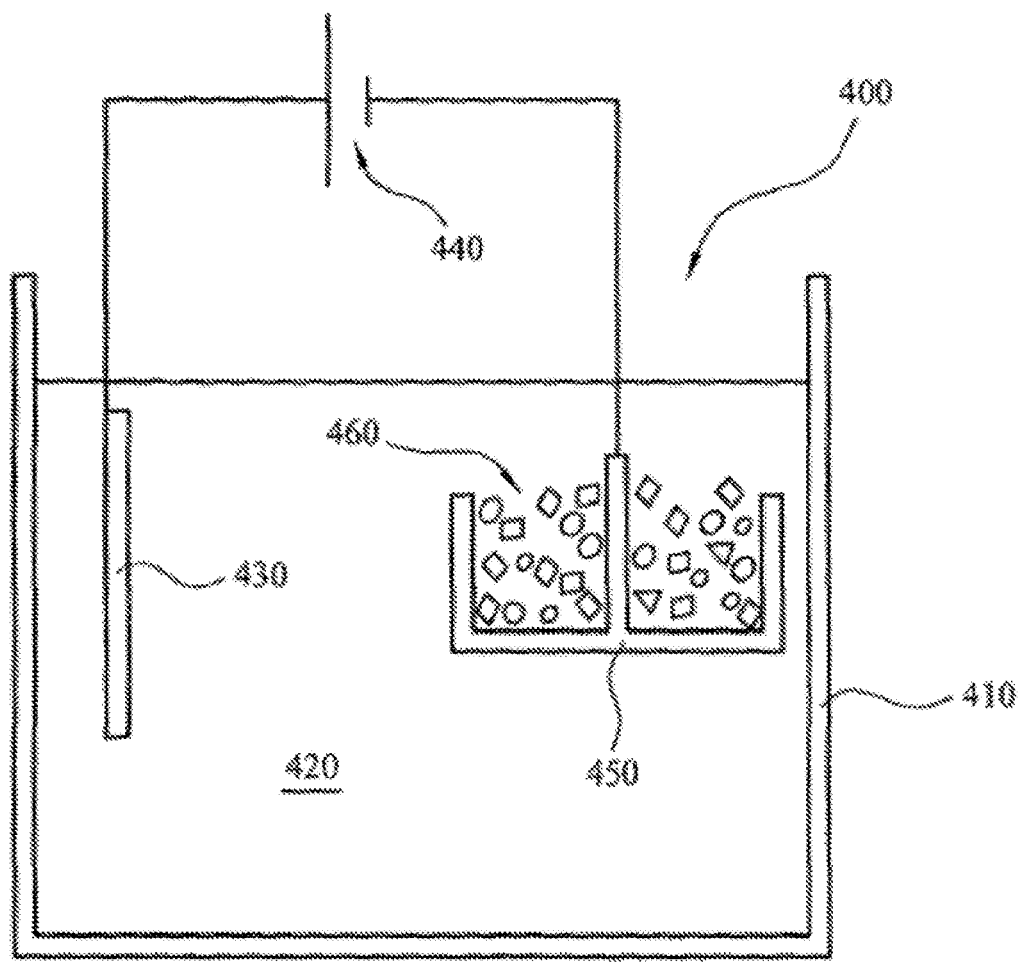
FIG. 1 shows a schematic diagram of an electrolysis cell for use in the methods of the invention.

In recent years there has been great interest in the direct production of metals by reduction of a solid feedstock, for example, a solid metal oxide feedstock. Such reduction may be performed, for example, to reduce metal oxides or semi-metal oxides to metals, or to reduce mixtures of metal oxides to form alloys or intermetallics.

One such reduction process is the Cambridge FFC electro-decomposition process as described in WO99/64638A. In the FFC method a solid compound, for example a solid metal oxide, is arranged in contact with a cathode in an electrolytic cell comprising a fused or molten salt. A potential is applied between the cathode and an anode of the cell such that the solid compound is reduced. In the FFC process, the potential that reduces the solid compound is lower than a deposition potential for a cation from the molten salt. For example, if the molten salt is calcium chloride then the cathode potential at which the solid compound is reduced is lower than a deposition potential for depositing calcium from the salt. Other reduction processes for reducing feedstock in the form of a cathodically connected solid non-metal compound have been proposed, such as the Polar™ process described in WO 03/076690 and the process described in WO 03/048399. Non-metal compounds such as metal oxides may also be directly reduced by metallothermic processes, for example the molten salt calciothermic process described in EP1445350.

Conventional implementations of the FFC and other electrolytic reduction processes typically involve the production of a feedstock in the form of a powder, or a preform or granulate fabricated from a powder of the solid compound to be reduced, for example by sintering. Suitable preform shapes are ring-shaped or tubular preforms as described in WO2010/146639A. The preforms are then loaded into a cathode, e.g. a cathode in the form of a metal basket. Once a number of preforms have been loaded into to the cathode, the cathode can be lowered into the molten salt and the preforms can be reduced. Contact between the preforms provides the necessary electrical conduction pathway for complete electrochemical reduction of the oxide.

The electrochemical reduction is typically performed using a carbon anode. Some carbon dioxide and carbon monoxide are evolved at the carbon anode by electrochemical oxidation of the carbon. Otherwise, the electrolysis is performed under an inert atmosphere using carefully dried salts for the electrolyte.

The present inventors have found that operation of the FFC process to produce titanium and tantalum metals can also be made to effect deposition of significant amounts of carbon at the cathode, on the surface of the electrochemically reduced metal. The present inventors have further found that this carbon, which has previously been discarded with the washings from the metal, contains substantial amounts of graphene. Without wishing to be bound by any theory, it is postulated that some of the carbon dioxide and/or carbon monoxide formed at the carbon anode dissolves in the molten salt electrolyte and is electroreduced to graphene at the cathode. The present invention therefore provides a method to obtain large quantities of graphene at minimal cost as a by-product of the electroreduction of metals.

Accordingly, in a first aspect the present invention provides a method of making a graphene material comprising the steps of: electrolytically reducing a transition metal oxide to a transition metal in an electrolytic cell using a molten salt electrolyte and a carbon anode; followed by extracting a dry graphene material from the electrolytic cell.

In a second aspect the invention provides a method of making a graphene material comprising the steps of: electrolytically reducing a transition metal oxide to a transition metal using a molten salt electrolyte and a carbon anode, wherein the step of electrolytically reducing results in deposition of a graphene material on the transition metal; separating the graphene material from the transition metal and the electrolyte; and drying the separated graphene.

The present inventors have further found that transition metals, in particular titanium, catalyse the production of graphene at the cathode. The transition metal oxide may be mixed with other metallic oxides, including other transition metal oxides or non-transition metal oxides. In these embodiments, suitably all of the metal oxides are reduced to the corresponding metals in admixture in the electroreduction step. The cathode material for electroreduction may thus comprise one or more oxides selected from the group consisting of beryllium, boron, magnesium, aluminium, silicon, scandium, titanium, vanadium, chromium, manganese, iron, cobalt, nickel, copper, zinc, germanium, yttrium, zirconium, niobium, molybdenum, hafnium, tantalum, tungsten, and the lanthanides. The product of a reduction process may comprise any of these metals, or an alloy or intermetallic comprising any of these materials, provided that a transition metal is present. Suitably, at least about 50 at. % of the oxides in the cathode are transition metal oxides, more suitably at least about 75%, and most suitably at least about 90%.

Suitably, the transition metal oxide comprises, consists essentially of, or consists of a titanium oxide or a tantalum oxide. Most suitably, the transition metal oxide comprises, consists essentially of, or consists of a titanium oxide. In embodiments, the transition metal oxide may comprise titanium oxide admixed with oxides of alloying metals in stoichiometric proportions, for example to make a Ti-6Al-4V alloy. The titanium oxide in the starting material of the cathode is suitably titanium dioxide, which is electrolytically reduced through various titanium suboxides to titanium metal during the process.

Suitably, the transition metal oxide or mixture is in the form of a powder, granulate, compacted powder body, and most suitably it is in the form of a compacted body. The compacted body may be made by conventional ceramic processing methods including but not limited to extrusion, pressing and sintering. The compacted body is suitably in the form of randomly-packable elements, such as ring-shaped elements. Suitable compacted body shapes and ceramic processing techniques are described in detail in WO2010146369A. Many different shapes of element could be used to provide a feedstock having the desired free space per $m^3$. A number of such shapes are described further in WO2010/146369A. It will also be appreciated that the oxide feedstock could alternatively be in the form of a powder having suitable particle sizes, for example as described in detail in WO2014/0268067A. The oxide feedstock could also be a granulate having controlled granule size and composition and formed by conventional granulation methods.

Suitably, the step of electrolytically reducing takes place in an atmosphere free of added water vapor, hydrogen or carbon dioxide. That is to say, no water, hydrogen or carbon dioxide are added during the process. Suitably, the step of electrolytically reducing is performed under an inert gas (apart from any reactive gases evolved during the electroreduction). The sole source of carbon for production of graphene is therefore carbon from the anode. It is thought that some of this carbon is oxidized to carbon dioxide and/or carbon monoxide during the electrolysis, some of which dissolves in the electrolyte and is reduced to graphene at the cathode.

The electrolysis is performed in a molten salt. The term "molten salt" refers to a melt of a salt having a melting point substantially above 100° C. Suitably, the step of electrolytically reducing is performed at a temperature above about 400° C., preferably above 600° C., more preferably about 800°-1000° C. The high temperatures provide the necessary electronic conductivity in the transition metal oxide containing cathode, and further improve the kinetics of the process.

Preferably the molten salt is a halide salt comprising a group 1 or a group 2 metal, for example a calcium chloride salt. Suitably, the electrolyte comprises less than 10 wt % of lithium salts, and most suitably it is substantially or completely free of lithium salts.

Thus, a preferred electrolyte for a reduction process may comprise a calcium salt. Calcium forms a more stable oxide than most other metals and may therefore act to facilitate reduction of any metal oxide that is less stable than calcium oxide. In other cases, salts containing other reactive metals may be used. For example, a reduction process according to any aspect of the invention described herein may be performed using a salt comprising lithium, sodium, potassium, rubidium, caesium, magnesium, calcium, strontium, barium, or yttrium. Chlorides or other salts may be used, including mixture of chlorides or other salts.

It may be particularly preferable that the molten salt further comprises a group 1 or group 2 metal oxide to provide oxide ion conductivity. Thus, in the example where the molten salt is a calcium chloride salt, the salt may further comprise a portion of calcium oxide dissolved within the salt. Suitably, the electrolyte comprises at least about 95% calcium chloride, and from about 0.5% to about 5% of calcium oxide. In these embodiments, the electrolysis is suitably conducted at temperatures in the range 900-1000° C.

The molten salt electrolyte is preferably substantially free from hydrogen ions. This can be achieved by using anhydrous material for the electrolyte, for example by thorough drying of the salts before use. Suitably, the molten electrolyte comprises, on a molar basis, less than about 400 ppm of $H^+$, preferably less than about 250 ppm of $H^+$, more preferably less than about 100 ppm of $H^+$.

The cathode is preferably formed by loading the transition metal oxide particles or compacted bodies into an inert metal holder such as a basket that is electrically connected to the source of electric current. The anode is formed of carbon, and preferably it consists essentially of carbon. Any suitable carbon anode may be used. For example, it may be a carbon anode of the type conventionally used for electrolytic manufacture of aluminium. These anodes are formed from aggregates of calcined sponge petroleum cokes or coal tar pitch cokes, along with recycled carbon anode remnants or butts. The aggregate is bound with coal tar pitch or a combination of coal tar and petroleum pitches (combination pitch) and subsequently shaped and heated at an elevated temperature, e.g. about 1100° C., to form the commercial anode. It is an advantage of the present process that inexpensive carbon materials can be used for the anode, since the production of graphene does not depend on exfoliation of graphite in the anode. More than one cathode and/or more than one anode may be present in a single electrolysis cell.

Electrolysis is continued for a time sufficient to achieve complete reduction of the metal oxides in the cathode. The electrolysis is suitably conducted at a current density of about 20 to 200 A per kg of oxide for a time of from about 10 to about 100 hours. The electrolysis potential is suitably below the decomposition potential of the electrolyte (the FFC process). For example, the electrolysis potential in a calcium chloride electrolyte may be about 2.5V. However, any of the molten salt electroreduction conditions and methods identified above may be suitable.

In alternative, less-preferred embodiments, higher voltages above the decomposition potential of the electrolyte may be used. In these embodiments, alkali metal or alkaline earth metal may be produced by electrolysis and react with the transition metal oxide to reduce the oxide.

The method may additionally comprise a step of flowing molten salt over and/or through the feedstock during electrolysis. The continuous movement of molten salt over the surface of the feedstock during an electrolysis reaction may increase the efficiency of the reaction. The free space within the feedstock may advantageously allow a flow of molten salt to pass through the feedstock relatively uninhibited. This may, advantageously, prevent any portions of molten salt from stagnating within regions of the feedstock and stop the build-up of reactive metal/calcium oxide. The free space may also provide multiple current flow paths through the feedstock. Random packing of the feedstock may result in a homogeneous distribution of free space through a volume of feedstock and, therefore, may mean that current can flow evenly throughout the feedstock. This is particularly important in a commercial process, to ensure that the same reaction conditions may be predictably and consistently applied to all regions of the feedstock.

When electrolysis is complete, the cathode(s) are removed from the molten salt and processed to recover the metal and graphene material. The processing includes suitable steps of crushing the cathodes and washing with water and acids to remove the residual electrolyte and the graphene material. The washings containing the graphene material are then processed to recover the graphene material. Suitable steps to recover the graphene material include filtration, centrifugation and/or interfacial separation. Interfacial separation refers to collecting the graphene that accumulates at the interfaces between water and air or water and organic solvents such as toluene. The collected graphene material is then dried, suitably at temperatures below about 100° C. and under vacuum or inert atmosphere to minimise oxidation of the graphene.

The step of separating may be performed for example, by methods comprising dispersing the electroreduced cathode material containing the transition metal and graphene in a suitable solvent such as water. The electroreduced cathode material may be crushed before or during the dispersion step. The graphene tends to remain in suspension or to float to the top of the liquid, which enables it to be separated from the metal. The graphene material can be collected by suitable methods such as filtration, surface skimming or centrifugation.

The dried graphene material is suitably substantially free of water-soluble electrolyte components. For example, it suitably comprises less than about 50% by weight of such components, more suitably less than about 20% by weight of such components, for example less than about 10% by weight of such components.

The as-collected graphene material may contain impurities such as metal particles, metal oxide particles and/or metal carbonate particles. These impurities may provide advantages in certain applications of graphene, for example in electrode materials. Alternatively, the methods of the present invention may further comprise treating the graphene to remove residual transition metal, carbonate and/or metal oxide materials therefrom. Such methods may include washing with suitable solvents, centrifugation, particle size separation methods such as filtration, or any other method suitable for purifying carbon or graphene. The washing steps are followed by separation and drying, as before.

It is an advantage of the present invention that the graphene material is produced by electrolytic reduction, and therefore is expected to be substantially free of graphene oxide. Nevertheless, if desired, the graphene material can be subjected to conventional chemical reduction steps to chemically reduce any graphene oxide that may be present.

In a further aspect, the present invention provides a graphene material obtainable or obtained by a method according to the invention. The graphene material contains graphene.

In the present application, the term "graphene" is used to describe substances consisting of from one to about ten layers of the ideal single-atom-thick graphene structure, preferably where the distribution of the number of layers in the product is controlled. Thus, in some embodiments, the graphene consists of one to five graphene layers, preferably one to four graphene layers, more preferably one to three graphene layers, for instance one to two graphene layers, e.g. one layer. The graphene produced may therefore have one, two, three, four, five, six, seven, eight, nine or ten layers. The term "graphene" herein also encompasses graphene oxide, chemically reduced graphene oxides, and carbon nanotubes and scrolls formed from graphene layers having thicknesses as defined above.

The term "graphene material" herein refers to a material comprising graphene. Suitably, the graphene material obtained or obtainable by the present invention is carbonaceous, that is to say suitably it comprises at least about 50% by weight of elemental carbon, more suitably at least about 60%, 75%, 90% or 98% by weight of elemental carbon (i.e. carbon not in the form of a chemical compound). The graphene material obtained in the present invention may additionally comprise other forms of elemental carbon besides graphene, including nanocrystalline carbon and amorphous carbon.

Figure 2A:
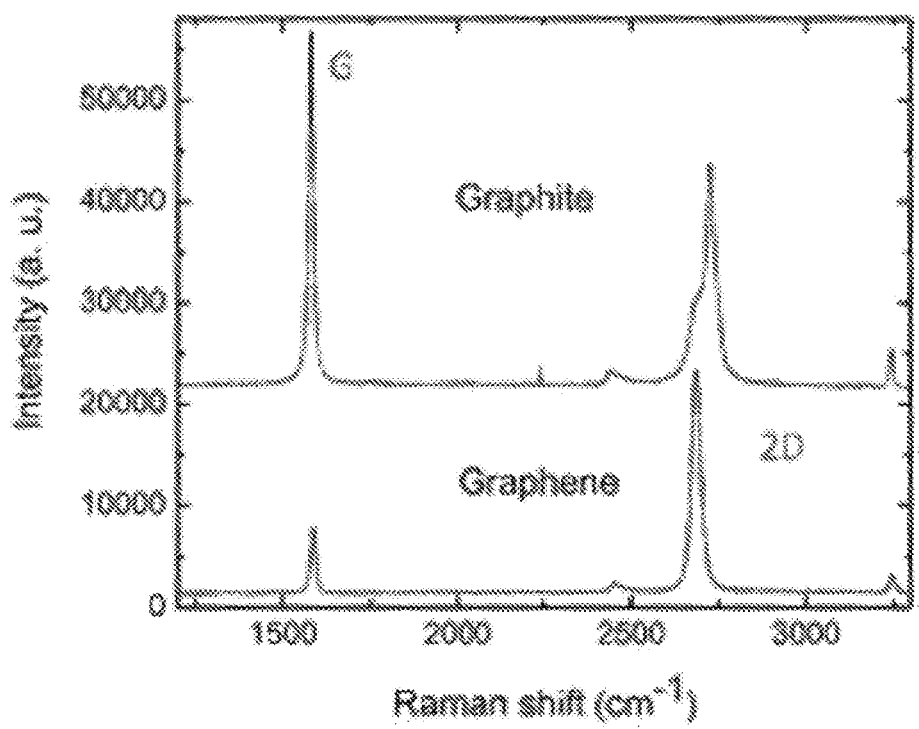
FIG. 2a-2b shows reference Raman spectra of pure graphite and pure single-layer graphene (FIG. 2a), and of pure single-layer, bilayer, and few-layer graphenes (FIG. 2b)
Figure 2B:
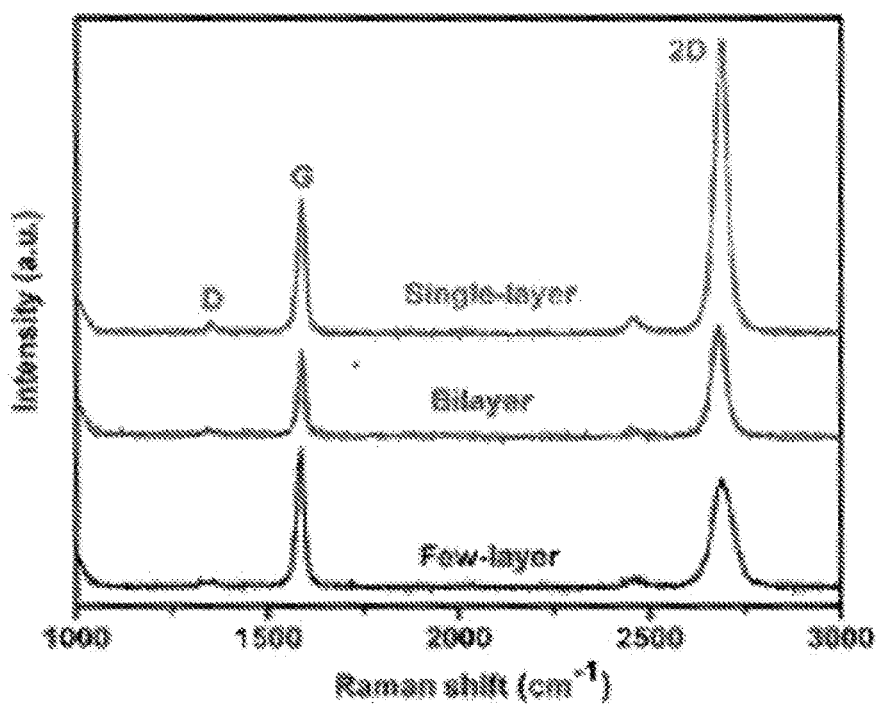

The proportion of the elemental carbon that is in the form of graphene can be estimated by Raman spectroscopy as explained further in the examples below. Briefly, graphene has a characteristic Raman spectrum different from that of graphite, as shown in FIG. 2a. The pure single-layer graphene spectrum has a single peak designated 2D with a Raman shift of about 2700 cm$^{-1}$. It further has a relatively weak G peak at a Raman shift of about 1600 cm$^{-1}$. For pure graphene, the intensity ratio of the 2D peak to the G peak is approximately 2. In contrast, graphite has a strong G peak and a relatively weak 2D peak that overlaps a 2D' peak at slightly higher Raman shift that is characteristic of graphite. It can be seen from FIG. 2b that the Raman spectrum undergoes a gradual transition from the ideal single-layer graphene shape to the pure graphite shape as the number of layers in the graphene increases. Thus, from the relative G intensity and by deconvolution or least-squares fitting of the 2D/2D' peaks it is possible to estimate the number of layers in the graphene component of the graphene material and/or the ratio of graphene to graphite in the material.

Suitably, the graphene material produced by the present process includes at least about 0.1% by weight of graphene as defined above, for example about 1%, about 2%, about 5% or about 10% of graphene. In embodiments, the material may comprise at least about 25% by weight, at least about 50% by weight, at least about 60% by weight, at least about 70 about % by weight, at least about 80% by weight, at least about 90% by weight, at least about 95% by weight, at least about 98% by weight, or at least about 99% by weight of graphene.

Suitably, the graphite nanoplatelet structures have a thickness of less than 100 nm. In embodiments, the graphite nanoplatelet structures are ≤90 nm thick, such as ≤80, ≤70, ≤60, ≤50, ≤40, ≤30 or ≤20 nm thick, preferably ≤10 nm thick and more preferably ≤1 nm thick.

The size of the graphene flakes produced can vary from nanometers across to millimeters, depending on the morphology desired. The flakes produced are desirably at least 90 pm in length, such as at least 80 pm, 70 pm, 60 pm, 50 pm, 40 pm, 30 pm, 20 pm, 10 pm, or 5 pm, for example at least 1 pm. In embodiments, the flakes produced are 1 to 100 pm in length, such as 1 to 90 pm, 1 to 80 pm, 1 to 70 pm, 1 to 60 pm, 1 to 50 pm, 1 to 40 pm, 1 to 30 pm, 1 to 20 pm, 1 to 10 pm, or 1 to 5 pm in length.

The graphene material obtained or obtainable by the methods of the present invention is dry. That is to say, it comprises less than about 20% by weight of water or organic liquid solvents, suitably less than about 10% by weight, more suitably less than about 5% by weight, and most suitably less than about 2% by weight of water or organic liquid solvents. The graphene material may further comprise incidental impurities, such as transition metal or transition metal oxide particles from the electrolysis cell, or residual electrolyte from the electrolysis cell.

The graphene material obtained or obtainable by the methods of the present invention is expected to have utility in a number of applications for which a low-cost and high-volume graphene material would be desirable. For example, as the disperse phase in a variety of polymer-matrix or metal-matrix composite materials. Another example would be as an electrode material in advanced secondary batteries, including metal-air and metal-sulfur batteries. In these applications, metal cations, such as lithium or sodium ions, are reduced to the respective metal at the electrode (anode) incorporating the graphene material during charging of the cell. The metals are dispersed and stabilized in the graphene material prior to discharge of the cell. The cathodes of these batteries may also contain the graphene material in combination with the active cathode material (such as a transition metal oxide) to improve the mechanical and electrical properties of the cathode.

Accordingly, in a further aspect the present invention provides a lithium- or sodium-ion electrochemical energy storage cell wherein the anode comprises a graphene material according to the present invention.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way. Non-limiting embodiments of the invention will now be described further with reference to the following examples.

EXAMPLES

Example 1

Preparation of Cathode Material

The titanium dioxide feedstock for the electrolytic reduction is in the form of a plurality of sintered pieces each in the form of an annulus or ring having a height of about 6 mm±0.5 mm and an outer diameter that is about 6 mm+1.0 mm. The wall thickness of the element is about 1 mm±0.5 mm. The weight of each element when made of $TiO_2$ is about 0.2 g.

The aspect ratio of the rings of approximately 1:1 gives the feedstock the property of random packing, i.e. a volume of the feedstock does not have any long-range alignment. A volume of one cubic metre of the elements has a surface area of approximately 1000 $m^2$ (that is the surface area of the element not including any porosity that the walls of the element may have; i.e. the macroscopic topological surface). When its constituent elements are randomly packed, the number density of the elements in the feedstock is about 3,000,000 per $m^3$, the feedstock has a free space (also termed free volume or voidage) of about 75%. Free space of the feedstock does not include any porosity within the material making up the body of each element, as described below. In this specific case the elements of the feedstock are rings and the free space is a function of the height, outer diameter and wall thickness of the rings.

The feedstock is made by extrusion of a titanium dioxide slurry. The slurry is formed by mixing titanium dioxide powder having a mean particle size (D50) of 1 μm and a binder. The slurry is extruded and sliced to form a plurality of element preforms and these preforms are then sintered at approximately 1050±50° C. for a period of about 4 hours to remove the binder and consolidate the preforms. The resulting elements consist of substantially pure titanium dioxide having a porosity of about 40%. That is, the material making up the body, or walls, of each element has porosity of about 40%.

Electrolysis

FIG. 1 is a schematic illustration of an electrolytic cell for reducing a feedstock according to method of the invention. The cell illustrated in FIG. 1 is used to reduce the titanium dioxide feedstock described above to titanium using the FFC Cambridge electro-decomposition process. The cell 400 comprises a salt bath 410 containing molten calcium chloride 420 ($CaCl_2$ having CaO content up to 11 wt %). A carbon anode 430 is immersed in the molten salt melt and connected to a power supply 440. A basket-like cathode structure 450 is also coupled to the power supply. The basket-like cathode 450 forms a basket for receiving the feedstock.

A volume of feedstock is poured into the basket-like cathode structure 450 and is therefore brought into contact with the cathode structure at a number of points (between edges and corners of the feedstock and the surface of the cathode). Once the basket-like cathode has been loaded with a volume of the feedstock 460, the basket and feedstock can be lowered into the molten salt such that the feedstock, or at least a portion of the feedstock, is in contact with both the cathode structure and the molten salt.

In order to electrolytically reduce the feedstock, a voltage is applied between the anode and the cathode sufficient to remove oxygen from the feedstock. The voltage is maintained such that oxygen is removed from the feedstock but calcium is not deposited on the cathode in metallic form. It may be advantageous to control the cell voltage by reference to a reference electrode arranged in the cell. Use of a reference electrode is not essential, however.

A suitable molten salt for performing the electrolytic reduction of many different feedstock materials may comprise calcium chloride. In the specific example of a reduction of titanium dioxide, a preferred salt is calcium chloride containing between about 0.3 to 0.6% dissolved calcium oxide.

Current is passed between the terminal cathode and terminal anode primarily by means of ionic transfer through the melt. For example, $O^{2-}$ ions are removed from the feedstock supported on the terminal cathode by electro-deoxidation and are transported to the anode. The electrochemical oxidation of the carbon anode and oxygen ions results in the evolution of a mixture of gaseous carbon monoxide, carbon dioxide and oxygen.

Electrons transported through the melt by the $O^{2-}$ ion are transferred to the carbon portion of the element and into the cathodic titanium portion of the element where they are available for the electro-decomposition reaction of the titanium dioxide. The electro-decomposition reaction causes the removal of oxygen from the titanium dioxide in the form of an $O^{2-}$ ion.

Separation of Products

After complete electrolytic reduction of the metal oxide, the cathode holder containing the reduced metal bodies is removed from the melt, cooled, and washed in water to remove electrolyte. The resulting cathode bodies consist of compacted metal powder with graphene material adhering to the surface. The bodies are crushed in water, and washed with aqueous acid. The graphene material has lower density than the metal and is therefore easily separated in the washings. A fraction of the graphene material is captured by interfacial separation onto a polyethylene surface to which it adheres, and is dried.

The reduced titanium metal powder may be further processed, for example by powder metallurgical methods, or by melting the titanium elements to form a billet.

Analysis of Graphene Material

A preliminary study of the graphene material was performed by Raman spectroscopy. Samples were prepared by dispersing the graphene material in acetone, with mild sonication being used (37 kHz/40% power/30 s). Approximately 10-20 μL of the dispersions were subsequently drop-cast on pre-cleaned 0.5 $cm^2$ $Si/SiO_2$ substrates and allowed to dry for 5-10 minutes at 70° C. Finally, samples were washed in acetone and dried in nitrogen. Raman spectra were taken on a Renishaw inViva system using 532 nm (2.33 eV) excitation energy (laser power of 1 mW) and a 100× objective, giving a spot size of approximately of 1 μm.

Figure 3:
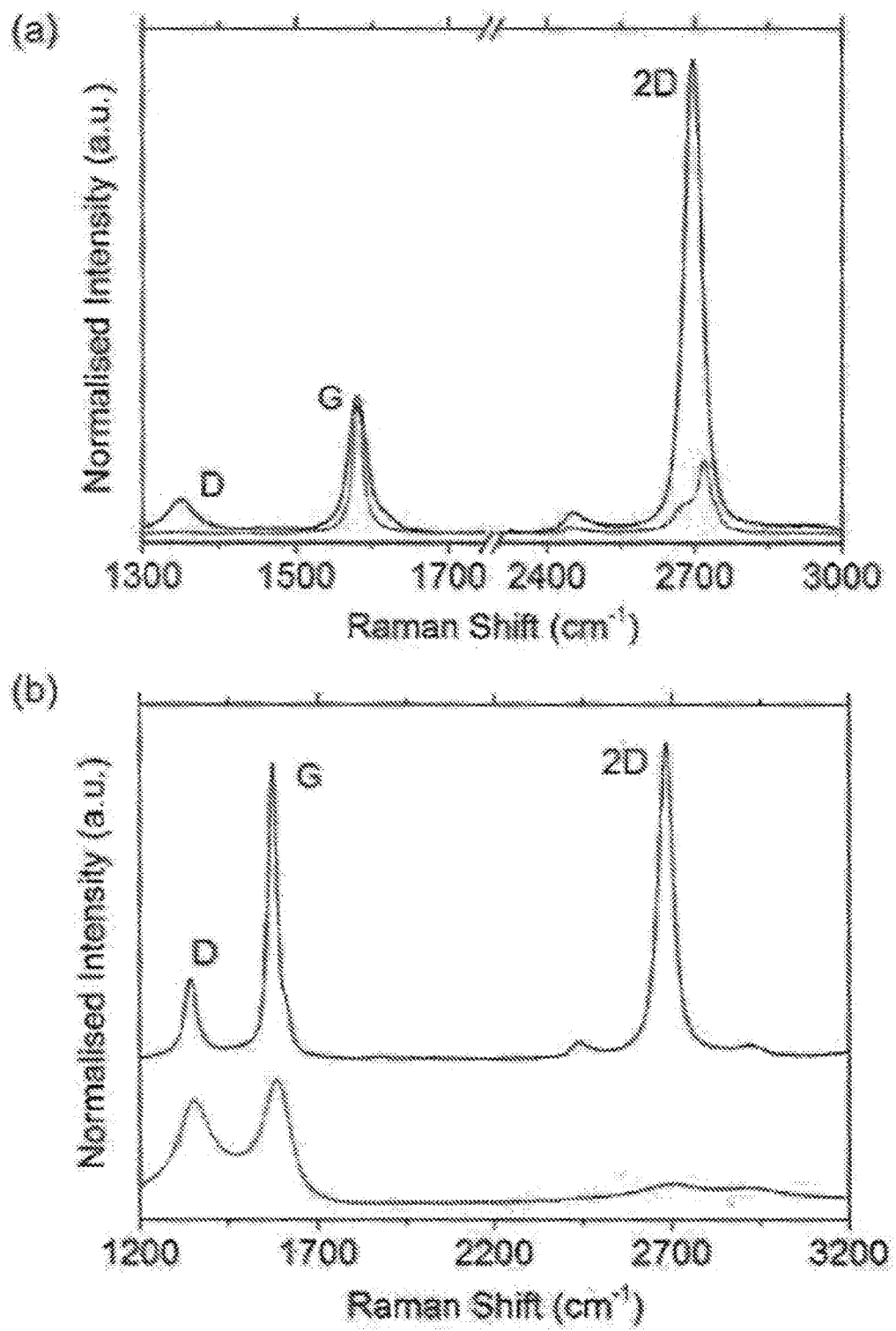
FIG. 3 shows Raman spectra of (a) a graphene material according to the invention
(upper trace) versus graphite (lower trace), and (b) a graphene material according to the invention (upper trace) and amorphous carbon (lower trace)

Spectra presented in FIG. 3 represent three accumulations at 10 s of exposure time. The spectra of the graphene material (upper traces) are compared with spectra for graphite (FIG. 3(*a*), lower trace) and for amorphous carbon (FIG. 3(*b*), lower trace). The observed spectra of the graphene materials of this invention show a sharp single peak at 2500-2900 $cm^{-1}$ that is characteristic for graphene.

A further study of the graphene material was performed by transmission electron microscopy (TEM).

Two samples were studied. A small quantity of each was crushed with pestle and mortar, suspended in isopropanol, sonicated and dripped onto standard holey carbon film TEM support grids. They were examined in the JEOL R005 TEM.

The first sample contained sparse amounts of heavy, spherical or cylindrical particles, often with faceted ends; these are probably some metal from the reaction vessel where the powders were produced. These particles were surrounded by a multilayer graphitic/graphene shell.

Abundant pieces of multilayer graphene were found that appear to have come off the heavy particles. Instances were found of particles with the carbon shell in the process of peeling off and becoming free multilayer graphene. The shell can be seen to crease and buckle as it does this, instead of spreading out into wide flat layers.

Those pieces of flat graphene that were found, were no bigger than ~20 nm across, making it impossible to confirm whether they were multilayer in nature using the usual technique of taking diffraction patterns from different tilts. The largest candidate piece was probably a graphene scroll edge. Unfortunately, it was too small for diffraction tilt analysis to succeed to check whether it was mono- or multi-layer graphene. However, in the body of the layer, ragged lines were seen that resemble steps found when layers within a multilayer raft terminate, so it is probable that this was multilayer graphene. The scroll edge contains ten fringes, so by looking at factors of ten it was possible to determine that either it was a five-layer raft that makes one complete turn within the scroll, or a two-layer raft that scrolls through two complete turns plus one half-turn.

The second sample did not have metal particles seen in the first sample. The same type of rolled-up pieces of multilayer graphene "peel" were seen, but flakes with single or low numbers of layers were more numerous. Many of these were folded, and the multilayer peel appeared more crushed.

The Raman and TEM studies therefore confirm that the graphene material obtained by the present invention comprise graphene.

Example 2

Further investigation was carried out to investigate a gravity separation (panning) method for concentrating the graphene fraction in titanium electrode washings.

Titanium electrode washings containing graphite material, prepared as described in Example 1, were processed by gravity separation (panning) as follows.

To maximise the representative nature of the samples, a Heidolph RZR 50 overhead stirrer operating at 1000 RPM was used to mix a 5 liter batch of the electrode washings. A baffle was placed in the barrel and a Masterflex 7529-10 peristaltic pump used to collect a sub-sample. From the 5 litres of material, 100 ml sub-samples were collected for test work.

One 100 ml sample was placed on a micro-panner for separation by gravity. The angle of the panner was adjusted so as to allow an approximate 50% mass split between concentrate (high density) and tailings (low density) samples.

Further washing was carried out on these samples to remove salt impurities, as follows. The samples were dispersed in distilled water, ultrasonicated for 10 minutes, vacuum filtered, washed with distilled water and solvent several times, and then dried in a vacuum oven at 80° C. The residual content of water and other volatiles in the dried material, as determined by thermogravimetry to 250° C. in nitrogen, was about 5-10 wt. %. Thermogravimetry (TGA) in air showed a sharp weight loss of about 61% of the weight of the sample at 450-500° C. associated with a sharp exotherm in DSC, consistent with the weight loss being due to oxidation of carbon to gaseous CO and $CO_2$. From this it can be concluded that the sample contained at least about 61% by weight of elemental carbon.

The samples were then submitted to the following measurements.

X-Ray Diffraction

The diffraction data were collected in a step scan mode on a Rigaku RAD-2B diffractometer XRD with Cu-Kα radiation of wavelength of 1.5406 Å in 2θ range from 5 to 90 at the rate of 0.02 in step width.

The powder diffraction patterns of both the low density and high density fractions showed the presence of diffraction peaks characteristic of various impurities including metallic iron (Fe), Iron Oxide (Wustite, FeO), titanium carbide (TiC) and calcium carbonate ($CaCO_3$). The diffraction pattern was substantially free of peaks attributable to graphite, suggesting that the carbon in the material is present in amorphous form, or other forms that do not give rise to strong X-ray diffraction peaks.

Elemental Analysis

Elemental analysis was carried out by using a Panalytical Energy dispersive X-ray fluorescence (EDXRF) spectrometer, Epsilon model. The purpose of this analysis was to detect impurities in the material, since carbon content is not measurable by XRF. The analysis showed the following elements to be present in significant quantities (in order of decreasing measured element content): Ti, Ca, Al, Fe and Mn.

FTIR and Raman Spectroscopy

ATR-FTIR spectra were recorded with Varian Scan 50 UV Spectrophotometer with a resolution of 2 $cm^{-1}$. The spectra showed IR absorption bands characteristic of hydroxyl groups (assumed to be from residual water) and carbonate groups (assumed to be from calcium carbonate)

Raman spectra were recorded with a Jobin-Yvon HR640 spectrometer fitted with an Andor Technology CCD detector operating with an excitation wavelength of 532 nm and 785 nm (Titan sapphire laser). The spectrum was acquired after 30-60 seconds laser irradiation time and 3 accumulations.

For the fitting calculations, each peak was isolated to a spectral region around it (1250-1450, 1500-1700 & 2500-2900 $cm^{-1}$ for peaks D, G and 2D respectively). A least-squares fitting process to minimise the residuals between the data and the selected peak shape was applied for each peak starting from simple defaults, converging on a fit, if possible. Equation fit was a vertically offset Lorentzian: $I=y_0+H[L^2/((x-x_0)^2+L^2)]$ (where I=intensity, $y_0$=vertical offset, H=peak height above offset, L=FWHM of peak, $x_0$=wavenumber of peak, x=wavenumber).

The 2D band was used to determine the number of layers in a graphene flake. In a mono-layer flake, the 2D band could be de-convoluted in a single and sharp peak while for graphite particles, it could be fitted in two bands. Based on this de-convolution fitting and considering the values of the coefficient of determination ($R^2$), it is estimated that for a $R^2$=0.990-0.995 is mono-layer graphene (MLG), $R^2$=0.985-0.990 is few-layer (FR), $R^2$=0.980-0.985 is multilayer (FLG) and $R^2$<0.980 is graphite.

Figure 4:
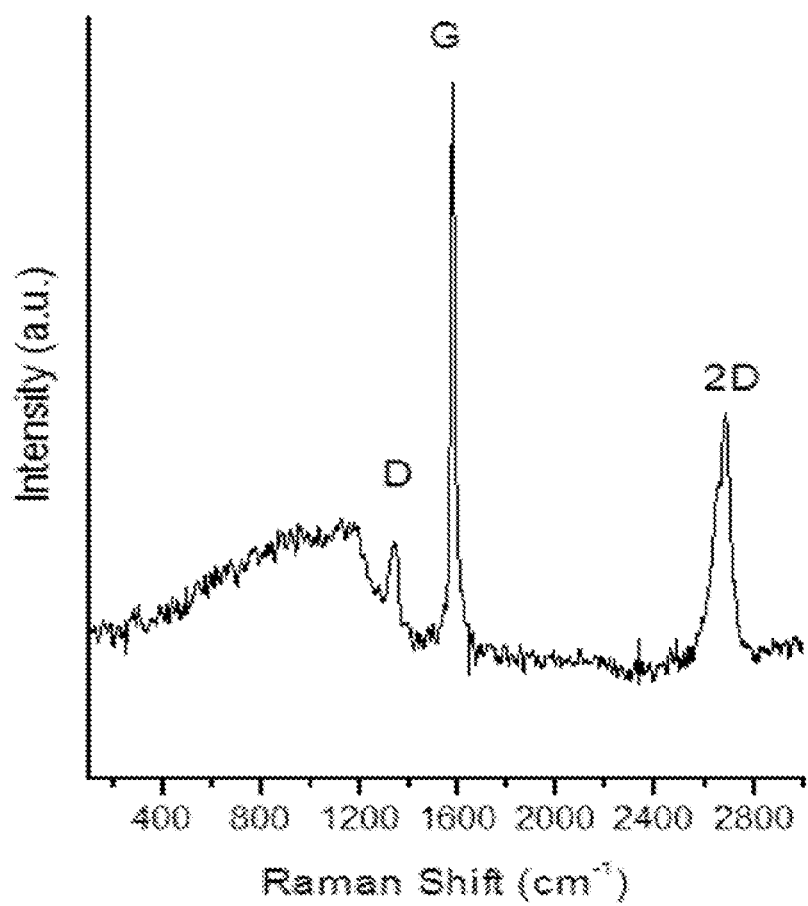
FIG. 4 shows the Raman spectrum of a further graphene material according to the invention.

The Raman spectrum of the high-density fraction showed the presence of graphene (FIG. 4) in addition to amorphous carbon and graphite. The Raman spectrum of the low-density fraction was characteristic of amorphous carbon.

Example 3

In this example the carbon material formed at the surface of the molten salt electrolyte reduction cell described in Example 1 was separated and investigated.

Some of the carbon material formed at the surface of the molten salt electrolyte is captured on and coats the titanium cathode during removal of the cathode from the melt after the electrolysis run. Approximately 47 kg of this surface carbonaceous material were chipped from the electrode after the electrolysis run. The sample contained approximately 888 g of insoluble material, of which about 50% is estimated to be carbonaceous. The chipped material was crushed in a jaw crusher to approximately less than 5 mm. A sub-sample of 1205.5 g was riffled out for grinding using a Jones splitter to maximise the representative nature of the sample. This was diluted using 4822 g of water to create slurry at approximately 20% solids by mass. Grinding was completed in a diameter mill containing 6×diameter rods. The grind time was 10 minutes and angular velocity 75 RPM. 100 ml was sub-sampled from the ground material. The ground material was mixed using the Heidolph RZR 50 overhead stirrer at 1000 RPM and the sample collected using the Masterflex 7529-10 peristaltic pump to maximise the representative nature of the sample. The 100 ml was then mixed using the Heidolph RZR 50 overhead stirrer for 60 minutes at 1000 RPM. This material was split into 50 ml test tubes and centrifuged at 3200 RPM for 30 minutes.

The resulting material was then subjected to a solvent interfacial separation method, as follows. The material was first filtered through a ZapCap® filter to remove coarse impurities. The filtrate was then mixed with toluene and allowed to separate in a separation funnel. This resulted in a black aqueous phase, a substantially clear toluene phase with some black floating material, and a black interfacial layer. The aqueous phase, interfacial layer, and toluene layer were separated and dried under vacuum.

Raman analysis was performed on the resulting fractions, as described above. The Raman spectra showed the presence of mainly amorphous carbon with little or no graphene in the aqueous and toluene fractions. However, the interfacial fraction showed the presence of graphene in addition to amorphous carbon.

This example therefore demonstrated the presence of graphene in the carbonaceous material formed at the top of the melt in the electrolysis cell, and further demonstrated an interfacial separation method for concentrating the graphene in the material.

Example 4

A sample of graphene material was prepared from electrolyte scum and investigated for use as a cathode material in a lithium secondary battery, as follows.

Crude graphene material washed from the electrolyte surface (scum) layer following electrolysis as described in Example 3 was subjected to interfacial separation at a toluene/aqueous interface as described in Example 3. The interfacial fraction was isolated and dried. 4.5 mg of this interfacial graphene material was used to form an electrode for a lithium electrochemical cell having the following structure:
Anode: Lithium Metal
  Electrolyte: 1 M $LiPF_6$ in ethylene carbonate:diethylene carbonate (EC:DEC) solvent
  Cathode: graphene material: PVDF (90:10).

Galvanostatic charge/discharge and cycling life plots were measured for the above electrochemical cell over the voltage range 0.01-3.0V (vs. $Li^+/Li$). Reproducibility was studied on two cells. Five cycles of charge/discharge were measured for each cell.

The results showed good reproducibility, and good stability of charge/discharge capacity of the graphene material for the $2^{nd}$ through $5^{th}$ charge/discharge cycles. The measured initial discharge capacity was 386-502 mAh/g, and the reversible capacity for the $2^{nd}$ through $5^{th}$ charge/discharge cycles was 248-256 mAh/g. This compares reasonably to the theoretical capacity of pure single-layer graphene, which is 744 mAh/g.

This example confirms that the graphene materials made in accordance with the present invention are suitable for use as electrode materials in battery types that conventionally use graphite or graphene electrodes, in particular lithium-ion batteries and potentially also sodium-ion batteries.

All patents referenced in the present specification are expressly incorporated herein by reference.

The above example is for the purpose of illustration only. Many other embodiments falling within the scope of the accompanying claims will be apparent to the skilled reader.

The invention is further described by the following numbered paragraphs:

1. A method of making a graphene material comprising the steps of:
electrolytically reducing a transition metal oxide to a transition metal in an electrolytic cell using a molten salt electrolyte and a carbon anode; followed by extracting a dry graphene material from the electrolytic cell.

2. A method according to paragraph 1, wherein the transition metal oxide comprises a titanium oxide or a tantalum oxide.

3. A method according to paragraph 2, wherein the transition metal oxide comprises a titanium oxide, or consists essentially of titanium oxide.

4. A method according to any preceding paragraph, wherein the step of electrolytically reducing takes place in an atmosphere free of added water vapor, hydrogen or carbon dioxide.

5. A method according to any preceding paragraph, wherein the method further comprises one or more steps of purifying the graphene material selected from centrifuging, panning, solvent separation, and interfacial separation.

6. A method according to paragraph 5, wherein the method comprises isolating graphene material from an interfacial region of an aqueous/water-immiscible organic solvent system, preferably wherein the water-immiscible organic solvent comprises or consists essentially of toluene.

7. A method according to any preceding paragraph, wherein the step of electrolytically reducing is performed at a temperature above about 400° C., preferably above 600° C., more preferably about 900°-1000° C.

8. A method according to any preceding paragraph, wherein the electrolyte comprises at least about 95 wt. % of calcium chloride and 0.5-5% calcium oxide.

9. A method according to any preceding paragraph, wherein the molten electrolyte comprises less than about 400 ppm of $H^+$, preferably less than about 250 ppm of $H^+$, more preferably less than about 100 ppm of $H^+$.

10. A method according to any preceding paragraph, wherein the step of separating the graphene comprises dispersing the transition metal and the graphene material in a solvent.

11. A method according to any preceding paragraph, further comprising treating the graphene material to remove residual transition metal and oxide materials therefrom.

12. A method according to any preceding paragraph, wherein the graphene material is extracted from the transition metal electrode following electrolysis.

13. A method according to any preceding paragraph, wherein the graphene material is extracted from a surface layer of the electrolyte following electrolysis.

14. A graphene material obtainable or obtained by a method according to any preceding paragraph.

15. A secondary battery comprising an anode and a cathode, wherein the anode or the cathode comprises a graphene material according to the present invention.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method of making a graphene material comprising the steps of:
   electrolytically reducing a transition metal oxide to a transition metal in an electrolytic cell using a molten salt electrolyte, the transition metal oxide comprising an electrode and a carbon anode;
   followed by extracting a graphene material from the electrolytic cell; and
   collecting the transition metal from the electrolytic cell.

2. The method according to claim 1, wherein the transition metal oxide comprises a titanium oxide or a tantalum oxide.

3. The method according to claim 2, wherein the transition metal oxide comprises a titanium oxide, or consists essentially of titanium oxide.

4. The method according to claim 1, wherein the step of electrolytically reducing takes place in an atmosphere free of added water vapor, hydrogen or carbon dioxide.

5. The method according to claim 1, wherein the method further comprises one or more steps of purifying the graphene material selected from centrifuging, panning, solvent separation, and interfacial separation.

6. The method according to claim 5, wherein the method comprises isolating graphene material from an interfacial region of an aqueous/water-immiscible organic solvent system.

7. The method of claim 1, wherein the step of electrolytically reducing is performed at a temperature above about 400 °C. and below 1000 °C.

8. The method according to claim 1, wherein the electrolyte comprises at least about 95 wt. % of calcium chloride and 0.5-5% calcium oxide.

9. The method according to claim 1, wherein the molten electrolyte comprises less than about 400 ppm of $H^+$.

10. The method according to claim 1, wherein the step of extracting the graphene comprises dispersing the transition metal and the graphene material in a solvent.

11. The method according to claim 1, further comprising treating the graphene material to remove residual transition metal and oxide materials therefrom.

12. The method according to claim 1, wherein the graphene material is extracted from the transition metal electrode following electrolysis.

13. The method according to claim 1, wherein the graphene material is extracted from a surface layer of the electrolyte following electrolysis.

14. The method according to claim 6, wherein the water-immiscible organic solvent comprises or consists essentially of toluene.

15. The method of claim 7, wherein the step of electrolytically reducing is performed at a temperature above about 600 °C. and below 1000 °C.

16. The method according to claim 1, wherein the step of electrolytically reducing is performed at a temperature of about 900°-1000° C.

17. The method according to claim 9, wherein the molten electrolyte comprises less than about 250 ppm of $H^+$.

18. The method according to claim 9, wherein the molten electrolyte comprises less than about 100 ppm of $H^+$.

19. The method of claim 1, further comprising drying the graphene material.

\* \* \* \* \*